Sept. 17, 1968     J. L. COAKLEY ET AL     3,401,603
FLUIDIC-HYDRAULIC SERVOACTUATOR
Filed March 3, 1967
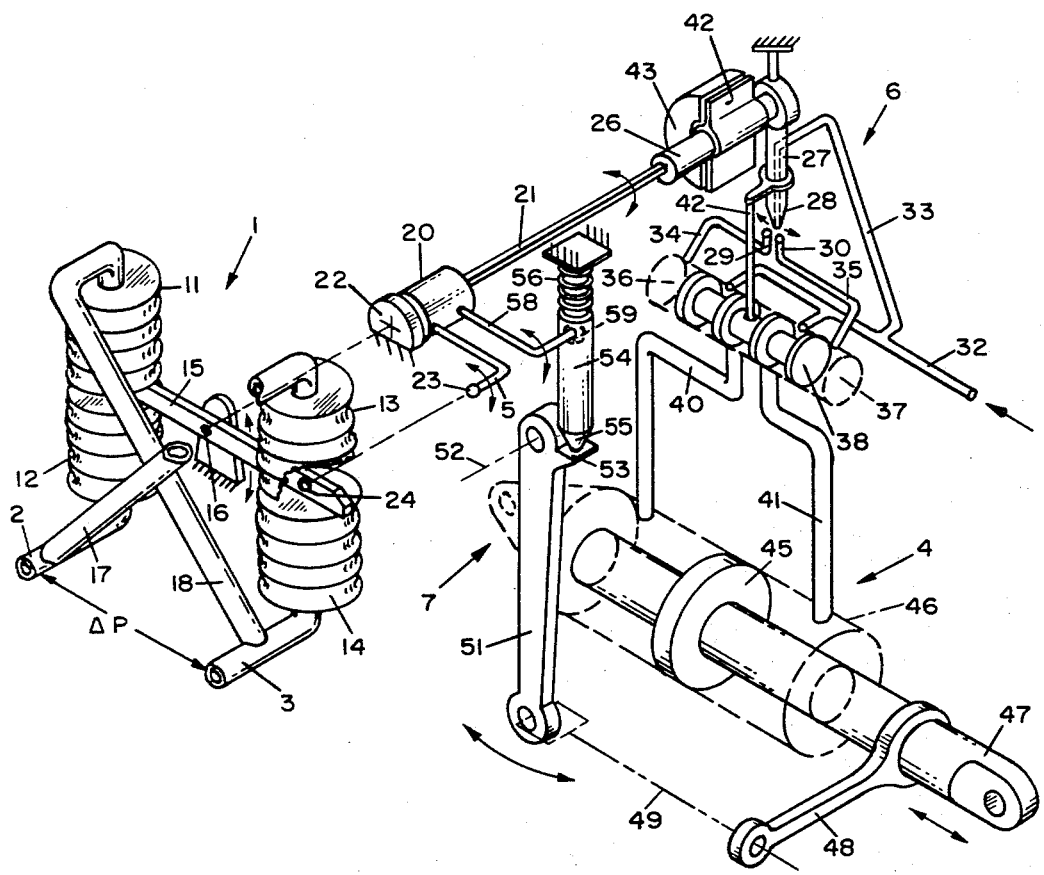
INVENTORS.
JAMES L. COAKLEY
PAUL M. LAWHEAD
BY
WOOD, HERRON & EVANS

United States Patent Office 3,401,603
Patented Sept. 17, 1968

3,401,603
FLUIDIC-HYDRAULIC SERVOACTUATOR
James L. Coakley and Paul M. Lawhead, Camarillo,
Calif., assignors to Abex Corporation, New York, N.Y.,
a corporation of Delaware
Filed Mar. 3, 1967, Ser. No. 620,336
13 Claims. (Cl. 91—387)

ABSTRACT OF THE DISCLOSURE

A servoactuator having a position output proportional to a pressure differential control signal, wherein the control signal is transduced to a mechanical movement which is in turn transduced to a torque and applied to a torque summer. A signal indicating the position of the actuator is also transduced to a torque and applied to the summer. The difference between these torques is used as an error signal to actuate a torque controlled servovalve which meters fluid to the actuator piston causing it to move in a direction reducing the error signal.

This invention is directed to a servomechanism which produces an output movement of a hydraulically operated piston or actuator proportional to a fluid pressure differential control or input signal. Such actuators may be used, for example, to position various movable control devices such as ailerons and trim taps of aircraft or rockets, or the rudder of a ship, in response to a differential between pressures in a pair of fluid lines. The pressure signal may constitute a difference in either gas or liquid pressures. This invention is especially useful for controlling hydraulic power components with low pressure logic elements such as are used in the field of fluidics.

The servovalve of this invention operates by minimizing the difference between a signal related to the input pressure and a signal related to the actuator output displacement. The pressure differential signal is first transduced to an angular movement through pressure differential operated means which rotates a lever or balance beam. Movement of the level deflects one of a pair of springs extending from a rotatable shaft and is transduced to a torque acting on the shaft. The linear displacement or position of the controlled piston or actuator is also transduced to a torque by a mechanical linkage or lever system which deflects the second of the pair ofsprings connected to the shaft. The shaft responds as a torque summer to the algebraic difference of these two torques, which is the difference or error between the input signal and the actuator position, and applies a corresponding torque to a torque-controlled servovalve. This servovalve regulates the fluid flow to the output piston or actuator in response to the input torque from the shaft. The flow to the piston through the servovalve is in such a direction as to cause the piston to move in a direction reducing the error signal.

In the preferred embodiment of this servoactuator, the input control pressures are applied to two pairs of area-balanced pistons or bellows having a low spring rate. These are differentially interconnected and are arranged symmetrically on opposite sides of a lever which is rotatable about an essentially frictionless central pivot. A differential between the input pressures will rotate the lever or beam about its pivot through a corresponding angle. An L-shaped spring is cantilevered at one end to a rotatable torque summer, and is coupled at its outer end to the lever through a close tolerance ball and aperture bearing. A feedback signal reflecting the displacement of the actuator is transduced to a torque and applied to the torque summer through a rotating lever which displaces a spring loaded piston or plunger in which the end of a second L-shaped cantilever spring is journalled. The summer responds to the difference between these torques which constitutes an error torque signal.

The servovalve through which fluid is metered to and from the actuator is preferably a two-stage valve having a closed center four-way spool type second stage with mechanical feedback between the two stages. It is controlled by a torque applied to its primary stage through a torsional shaft to which the torque summer is coupled. The first stage or preamplifier of the servovalve is of the jet pipe type, and the torsional shaft is connected to a driver in the first stage of the valve and deflects a jet pipe attached to the driver. A small flow of high pressure oil issues as a high velocity jet from one end of the jet pipe and is directed by the pipe toward a pair of receiver ports. When the jet pipe is centered between the two ports, the jet of fluid develops equal pressures at each port, and those pressures are applied to the respective opposite ends of the second stage spool of the servovalve causing it to maintain its position. When a torque signal is impressed on the driver through the torsion shaft, the jet pipe is rotated to an offcenter position between the ports and a pressure unbalance is applied across the second stage spool, causing it to move. As the spool displaces from null it deflects a feedback spring developing a force counter to the input torque on the driver, and this force gradually returns the jet tube to null, and the spool thereupon stops in its new position. Spool displacement is proportional to the input driver torque. The flow through the servovalve to the actuator is proportional to the displacement of the servovalve spool, and is therefore also proportional to the error signal torque on the torque summer. Hence the actuator will move at a rate corresponding to the error signal, and stops when the error has been reduced to zero.

The invention can best be further described with reference to the accompanying drawing which shows a preferred form of servoactuator incorporating the features of the invention.

The pressure differential input signal to the servoactuator is designated in the drawing as ΔP, and is applied to pressure actuated transducer means designated generally at 1 through a pair of lines 2 and 3. The actuating pressures may be liquid and/or gas pressures. In response to this pressure differential input, the servoactuator controls the position of an actuator, piston or ram designated generally at 4. In accomplishing this the pressure differential input signal ΔP is transduced to an angular movement which produces a torque through spring means designated at 5 connected to operate a torque controlled servovalve designated generally at 6. A feedback signal related to the position of ram 4 is transduced to a torque by feedback means designated generally by 7 and is summed with the torque of spring 5 so that the servovalve 6 is operated by an error signal defined as the algebraic difference of the torque transduced from the input pressure signal and the torque transduced from the ram position.

In preferred embodiment the pressure actuated transducer means 1 includes four equal area bellows 11, 12, 13 and 14 which are mounted in pairs at opposite ends of a lever, movable member, or balance beam 15. Lever 15 is centrally pivoted about an axle or bearing 16.

Bellows 11–14 are interconnected in pairs; that is, pressure fluid in line 2 is applied to bellows 12 and, through a branch line 17, to bellows 13. Similarly, pressure fluid in line 3 is applied to bellows 14, and through a branch line 18, into bellows 11. When the pressures in lines 2 and 3 are equal, that is, when ΔP equals 0, uniform forces act in each of the bellows and lever 15 is not moved about its pivot 16. However, when the pressure in line 2 exceeds that in line 3, then the pressure in bellows 12 and 13 exceeds that in bellows 11 and 14, and lever 15 is swung in clockwise direction in the drawing. Opposite lever movement results when the pressure in line 3 exceeds the pressure in line 2. Thus, when a pressure differential signal is applied between lines 2 and 3, one bellows at a given end of the lever will expand and the other will contract or be compressed. By the means 1 the pressure differential input signal is transduced to a proportional rotary displacement of lever 15.

Rotary motion of lever 15 applies a torque to a torque summer 20 through a first spring 5. The torque summer 20 includes a collar connected at one end to a torsional spring shaft 21 and supported at the other end by a bearing 22. Shaft 21 and bearing 22 are coaxial with pivot 16. The spring 5 is L-shaped and is rigidly fixed or cantilevered at one end to the torque summer 20. At its outer end spring 5 has a spherical ball 23 which is closely but rotatably fitted in a cylindrical opening 24 in lever 15. The coupling between spring 5 and lever 15 should be as nearly frictionless as possible.

The torsional shaft 21 comprises a resilient or spring rod, and twisting of torque summer 20 is applied by shaft 21 as an input torque to the torque responsive servovalve. Servovalve 6 does not of itself comprise the invention and may be of a type well known per se. For example, the servovalve 6 may be similar to that described in Coakley and Kubilos patent application Ser. No. 530,916, filed Mar. 1, 1966, and titled, "Improved Servovalve Construction," to which reference is hereby made.

Servovalve 6 includes a driver 26 (designated by number 65 in application Ser. No. 530,916) which is supported by a frame (not shown herein) for rotary movement about a longitudinal axis coinciding with that of shaft 21, and shaft 21 is connected to one end of this driver 26 to transfer torque thereto. The driver 26 is connected to deflect, swing or bend a resilient or flexible jet pipe 27. The upper end of jet pipe 27 is mounted rigidly, but the outer or free end 28 of jet pipe 27 is deflectable, relative to a pair of receiver ports 29 and 30, by rotation of driver 26. Pressure fluid from a conventional source of pressure is supplied at all times into the upper end of jet pipe 27 through lines 32 and 33, and is discharged from the pipe as a high velocity jet through a nozzle at the free end 28 of the pipe, which directs the fluid toward the receiver ports 29 and 30. The impingement of this jet of fluid on the receiver ports 29 and 30 establishes pressures in each of them, which pressures are applied through lines 34 and 35 respectively into control chambers 36 and 37 at opposite ends of the second stage spool 38 of valve 6. When the jet from the nozzle 28 impinges equally on receivers 29 and 30, equal pressures are established in the control chambers 36 and 37, and spool 38 is in hydraulic balance. However, when the jet is deflected from this centered or null position, unequal pressures are established at the receiver ports, and then unequal pressures are applied in control chambers 36 and 37 causing spool 38 to be shifted. Movement of the spool from its closed center position opens a flow path from the pressure inlet line 32 to one of a pair of outlet or work ports 40, 41. The porting of the second stage of servovalve 6 is such that the other outlet line 41 or 40 is connected to a tank or reservoir, not shown, all of which is described at length in application Ser. No. 530,916. An internal feedback spring 42 (corresponding to element 125 of application Ser. No. 530;916) of servovalve 6 is connected between the spool 38 and jet pipe 27, and supplies a force to the latter restoring it to center position when the spool has been shifted by differential pressures in control chambers 36 and 37 in an amount proportionate to the torque on driver 26.

The work or outlet lines 40 and 41 are connected from servovalve 6 to opposite ends of the cylinder 46 in which piston 45 of actuator 4 moves. The orientation of these fluid interconnections is such that when a clockwise torque (as viewed in the drawing) is applied to driver 26, pressure fluid is supplied to outlet line 40 and line 41 is connected to the tank causing piston 45 to move outward in cylinder 46, and such that when a counterclockwise torque is applied to driver 26 by torsion shaft 21, pressure fluid is supplied to line 41 and line 40 is connected to tank.

It should be pointed out that servovalve driver 26 is not electrically operated by an electromagnetic torque motor with which it may ordinarily be associated, but rather is responsive to the torque applied to it by shaft 21. However, the winged armature 42 connected to driver 26 is subject to a polarizing flux established by opposite permanent magnets, one of which is designated at 43, to provide a negative spring rate on the driver. This negative spring rate is closely matched to the total positive spring rate from all sources acting on jet pipe 27 so that a very small torque on driver 26 will result in a relatively large deflection of the jet pipe. This increases the speed at which the valve spool reaches its steady state position.

Resiliency between the torque summer 20 and jet tube 27 is provided by shaft 21 which is yieldable in torsion as a spring, or alternatively by an equivalent intermediate spring. This resiliency serves to reduce the inertial effects of the torque summer and bellows on the servovalve armature.

The work conduits 40 and 41 are connected to opposite sides of piston 45 of linear actuator 4, to operate the ram 47. A side arm 48 projecting at right angles to the axis of ram 47 is mounted to the ram for movement therewith, and this arm 48 is connected by suitably dimensioned linkage 49 (indicated by broken lines) to the feedback mechanism designated generally at 7. This feedback mechanism 7 includes a pivoted lever 51 mounted for rotation about an axis 52, and it presents a shoulder or bearing 53. A piston or plunger 54 having a small ball at its lower end 55 is held against lever shoulder 53 by a compression spring 56 and is guided for movement along a line at right angles to shoulder 53. A second L-shaped spring 58, which is preferably shaped and dimensioned similarly to spring 5, is mounted or cantilevered at one end to the torque summer 20 and has a ball indicated by the dotted lines 59 at its outer end. The ball 59 is received in an essentially playless and frictionless pivot aperture or surface in plunger 54.

Together the springs 5 and 58, acting through element 20, apply to shaft 21 a torque equal to the difference of the torques acting on the springs individually.

The movement of actuator 4 resulting from a pressure differential applied between lines 2 and 3 causes lever 51 to be swung in a direction tending to reduce the net torque on shaft 21 and thereby to return the valve spool 38 to a centered position, stopping movement of the actuator. The resulting displacement of ram 47 is substantially proportional to the magnitude of the input pressure differential control signal.

While the foregoing constitutes a preferred embodiment of the invention, those skilled in the art will appreciate that the principles of this invention can be utilized in other servoactuators within the scope and spirit of the following claims.

1. A servoactuator for positioning a piston in proportion to a pressure differential control signal, said servoactuator comprising, pressure actuated transducer means responsive to said pressure differential control signal to move a movable member in proportion to said signal, a rotatable shaft having a first spring projecting angularly therefrom which engages said movable member and which is stressed by movement of said member, a piston, a torque controlled servovalve for regulating the flow of pressure fluid from a source to said piston in proportion to a torque input to said servovalve, said servovalve being actuated by torque applied thereto through said shaft, and a feedback coupling between said piston and said shaft, said coupling comprising means moving a surface in proportion to the movement of said piston, a second spring projecting angularly from said shaft which engages said surface and which is stressed by movement of said surface, said first and second springs together applying a torque to said shaft which is proportional to the algebraic difference of their individual torques, said shaft being yieldable as a spring in response to the torques applied thereto by stressing of said first and second springs.

2. The servoactuator of claim 1 wherein the member moved by said pressure actuated transducer means comprises a centrally pivoted lever.

3. The servoactuator of claim 2 wherein said pressure actuated transducer means comprises at least one pair of bellows opposite engaging said lever.

4. The servoactuator of claim 2 wherein said shaft is pivoted for rotation about an axis colinear with that of said lever.

5. The servoactuator of claim 4 wherein said first spring engages said lever through a low-friction bearing.

6. The servoactuator of claim 1 wherein said first and second springs are cantilevered at right angles to said shaft.

7. The servoactuator of claim 6 wherein said springs are L-shaped and have legs extending in opposite directions.

8. The servoactuator of claim 1 wherein said feedback coupling includes a lever rotated by movement of said piston.

9. The servoactuator of claim 8 wherein rotation of said lever displaces a spring-loaded plunger, said plunger presenting said surface.

10. The servoactuator of claim 1 wherein said first and second springs engage said movable member and surface respectively through spherical balls received in cylindrical openings in said movable member and presented by said surface, respectively.

11. The servoactuator of claim 1 wherein said servovalve is a two-stage valve of the jet pipe type having internal mechanical feedback between the stages, and wherein said shaft is connected to deflect the jet pipe of said servovalve.

12. A servoactuator for positioning a piston in proportion to a pressure differential control signal, said servoactuator comprising, a piston, a servovalve for regulating the application of pressure fluid flow from a source to said piston in proportion to a torque input to said servovalve, a rotatable shaft connected to said servovalve to apply said torque input thereto, pressure actuated means responsive to said pressure differential control signal to apply a torque to said rotatable shaft, and spring means applying a torque to said shaft in proportion to the movement of said piston, said shaft being responsive to the difference between the torques applied thereto by said pressure actuated means and by said spring means, said difference comprising an error torque signal, said shaft being yieldable as a spring in response to said error torque signal, said servovalve applying pressure fluid to said piston in a direction tending to move the latter to reduce said error torque signal.

13. A servoactuator for positioning a piston in proportion to a pressure differential control signal, said servoactuator comprising, opposed bellows responsive to said pressure differential control signal to pivot a lever about an axis in proportion to said signal, a shaft rotatable about an axis, a first spring cantilevered at one end from said shaft and at its other end engaging said lever, said first spring being stressed in bending by pivoting of said lever, a piston, a jet tube servovalve for regulating the application of pressure fluid from a source to said picton, said servovalve being responsive to torque applied to a driver thereof through said shaft, means movable lineally in proportion to the movement of said piston, and a second spring cantilevered at one end to said shaft and at its other end engaging said lineally movable means, said second spring being stressed in bending by movement of said lineally movable means, said first and second springs together applying a net torque to said shaft which is proportional to the difference between their individual torques.

References Cited

UNITED STATES PATENTS

| | | | |
|---|---|---|---|
| 2,102,504 | 5/1934 | Beardsley et al. | 91—387 |
| 2,884,907 | 5/1959 | Atchley | 91—387 |
| 2,940,699 | 6/1960 | Plummer | 91—363 |

PAUL E. MASLOUSKY, *Primary Examiner.*